Patented June 29, 1948

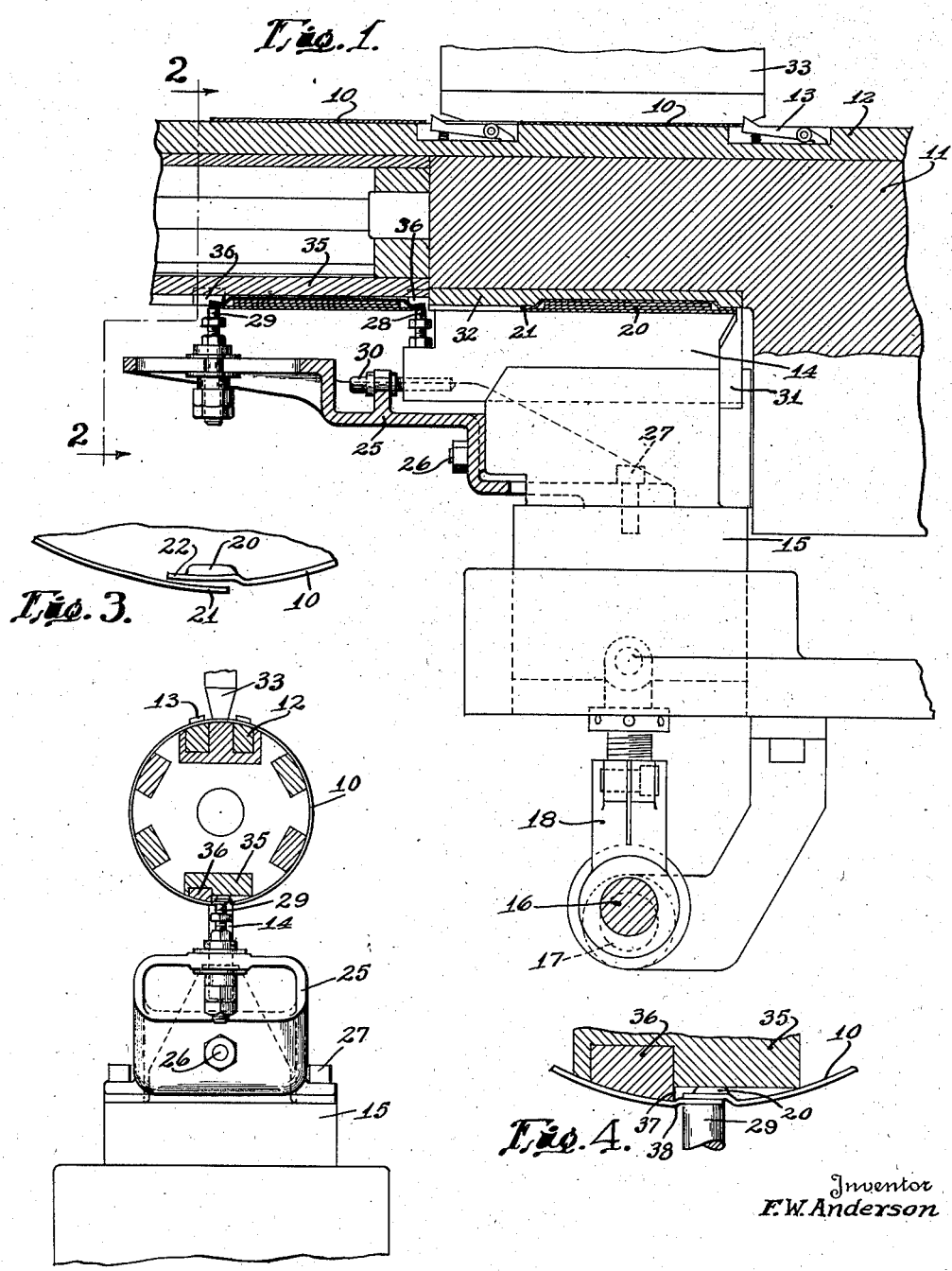

2,444,277

UNITED STATES PATENT OFFICE 2,444,277

MACHINE FOR MAKING CAN BODIES

Folke W. Anderson, Chicago, Ill., assignor, by mesne assignments, to Continental Can Company, Inc., New York, N. Y., a corporation of New York Application October 13, 1943, Serial No. 506,055

3 Claims. (Cl. 113—12)

My invention relates to machines for making the bodies of cans or other sheet metal containers, and particularly to improvements in the means for making the end portions of the longitudinal body seams.

In the art of manufacturing sheet metal containers, the practice throughout the industry is to form the body portion of a container in an automatic body maker, the sheet metal blank being wrapped around a horn, either to round or other shape such as rectangular or oval, the horn having the same outer peripheral contour as the finished container. The longitudinal marginal portions of the blank which are to form the body seam, are bent back to form hook portions which are then hooked together. A hammer or bumping steel is thereafter brought into contact with the hooked portions in a manner to tightly squeeze the said portions together and thereby form the longitudinal body seam which maintains the body in the shape to which it was previously formed.

The hooked portions of the body seam terminate a short distance from the ends of the blank while the end portions of the seam consist of overlapping strips or marginal portions of the blank. This construction is obtained by cutting away corner portions of the blank, prior to the body forming operations.

The purpose of providing these lapped portions of the seam is to facilitate the double seaming operation uniting an end of the container to the body. In this manner only two thicknesses of the body metal are formed into the double seam of the container body in combination with a container end, instead of the four plies or thicknesses which are comprised in the hooked portion of the seam. After the body forming and hook setting down or bumping operations, the outer lap of the end portion of the seam tends to separate from the inner lap portion because of the normal inherent resilience of the metal. This causes a spring-like action by which the outer lap portion springs outward away from the inner lap when the bumping steel is withdrawn. During the operation of soldering the longitudinal seam, these separated laps are pressed together due to pressure exerted by the solder roll. As soon as the container body passes beyond the solder roll and the pressure is removed, the spring-like action of the metal causes the outer lap to separate from the inner lap, because the solder has not yet hardened nor set sufficiently to hold these laps together. This results in a defective seam so that the finished container, after the container end has been double seamed thereon, fails in the testing operation applied thereto.

An object of my invention is to provide new and practical means for overcoming the above difficulty and insuring a perfect seal between the overlaps at the ends of the body seam.

A further object of the invention is to provide means adapted for use in combination with and forming an improvement on a conventional type of machine for making can bodies, by which an overlapped end portion of the blank is bent or deformed in such a manner that it will not spring away from the cooperating lapped portion therebeneath when the bumping tool is withdrawn, thereby obviating any tendency of the overlapping portions to separate following the soldering operation.

Other objects of the invention will appear hereinafter.

Referring to the accompanying drawings:

Fig. 1 is a longitudinal part-sectional elevation of a portion of a can body forming machine to which the present invention is applied, said view showing a section of the horn and the bumper mechanism.

Fig. 2 is a cross-sectional elevation at the line 2—2 on Fig. 1.

Fig. 3 is a fragmentary view showing the overlapped end portions of the blank with said end portions sprung apart.

Fig. 4 is a fragmentary part-sectional view showing the means for bending or deforming the outer lap of the seam.

The can body 10 may be formed from a flat sheet metal blank by wrapping the blank around a horn 11 at the forming station. The marginal portions of the blank are bent to hook form, the hooks are interlocked and the can body positioned at the bumping station. These operations may be performed with mechanism comprised in a conventional machine such as disclosed for example, in the patent to Peters, No. 1,625,091, April 19, 1927, for Can body making machine.

The can body 10 is advanced along the horn 11 to the different stations by means of feeder bars 12 mounted to reciprocate in the horn and carrying feeder fingers 13 which engage the can bodies. At the bumping station a bumper or hammer 14, which may be made of hardened steel, is attached to a carrier or slide 15 movable up and down in slideways. The means for reciprocating the carrier comprises a motor driven power shaft 16. A crank 17 on the shaft is connected through a pitman 18 to the carrier 15. The hammer or bumping slide 14 as it is moved up and down compresses the interengaged hooked margins of the blank and compresses them to form the four-ply seam 20 extending lengthwise of the can body. Each end of the seam comprises a short section consisting of outer and inner overlapping portions 21 and 22 resulting from omitting or cutting away short marginal portions at the corners of the blank. The side seam may be referred to generally as comprising interlocked hooks extending throughout the greater portion of the length of the side seam and lap sections at the end thereof.

When the bumper 14 is withdrawn after compressing and forming the seam, the outer lap 21 springs away from the inner lap 22, as shown in Fig. 3, owing to the inherent resiliency of the metal. This often results in a defective seam at this point because these overlapped portions which are held together during the application of solder thereto, spring apart when the soldering roll is withdrawn, before the solder has hardened sufficiently to hold these overlapped portions together. The mechanism for overcoming this difficulty will now be described.

A pair of setting down or bumping pins 28 and 29 are mounted respectively on the bumper 14 and a bracket 25 attached to the carrier 15 as by means of bolts 26 and 27. These pins extend upwardly beneath the horn in position to contact each lap section only of the side seam when the latter has been fed forward by the fingers 13 after the bumping operation. The pin 29 is adjustable lengthwise in the bracket for spacing the pins to correspond to the length of the blank. An adjustment screw 30 in the bracket 25 serves to adjust the location of the hammer 14 and a gage 31 in proper relation to the position of the can body 10 at the body forming station. A spline insert 32 in the forming horn 11, is arranged to form the hooked longitudinal side seam of the container body. A backing member 33 serves to support the horn 11 during the bumping operation.

After the bumping operation, the slide bar 12 operates to advance the workpiece and position it on an extension of the horn including a bar 35 or backing strip for the seam and in which is an insert bar 36 having its inner edge 37 (Fig. 4) projecting downwardly beyond the lower face of the bar 35. The outer or lower face of the bar 36 at said edge is thus offset downwardly, below or outwardly from the adjoining face of the backing strip 35. The insert bar 36 is in position to extend along one side of the longitudinal seam 20 and when the carrier 15 is moved upward, each of the setting down pins 28 and 29 engages a lower lap 21 and forces it upwardly, thereby forming a bend 38 in the metal around the corner of the bar 36. Each setting down pin is offset laterally a short distance from the edge 37 (Fig. 4) sufficient to prevent shearing of the metal at said edge and to permit said formation of the bend 38. There is thus produced a deformation or molecular rearrangement in the metal along this bend by which the tendency of the lap to spring outward in the manner shown in Fig. 3, is removed. The resiliency or outward bias of the inner lap 22 is not affected by this operation, so that when the pins 28, 29 are withdrawn, the laps 21 and 22 will retain their proper relation, (shown in Fig. 4), for the soldering operation. In this manner all tendency of the laps to spring apart after the solder roll has been withdrawn is overcome, so that there is no movement of the laps relative to each other while the solder is cooling and hardening.

Modifications may be resorted to within the spirit and scope of my invention.

I claim:

1. A lap and lock seam body forming machine comprising a horn around which the container body is formed and the hooks interlocked, a bumping means for bumping the interlocked hooks, said horn having an extension provided with an outwardly offset portion disposed along one side of the lap sections of the side seam, and bumping devices associated with said extension of the horn and disposed at the lap sections of the side seam for engaging the lap sections only subsequent to the bumping of the seam for bending the metal at the side of each outer lap section inwardly over said offset portion to tension the metal supporting said outer lap section so as to hold the lap sections in intimate contact while solder bonding.

2. A lap and lock seam body forming machine comprising a horn around which the container body is formed and the hooks interlocked, a bumping means for bumping the interlocked hooks, said horn having an extension, a bar carried by said extension and having its outer edge offset outwardly, said bar being disposed along one side of the lap sections of the side seam, bumping pins spaced lengthwise of the can body so as to engage the lap sections of the seam only, and means for moving said pins into engagement with said outer lap sections for bending inwardly the metal along the outwardly projecting portions of said bar to tension the metal supporting the outer lap section so as to hold the lap sections in intimate contact while solder bonding.

3. A lap and lock seam body forming machine comprising a horn around which the container body is formed and the hooks interlocked, a bumping means for bumping the interlocked hooks, said horn having an extension, a bar carried by said extension and having its outer edge offset outwardly, said bar being disposed along one side of the lap sections of the side seam, said bumping means including a hammer, a reciprocating support carrying said hammer, bumping pins mounted for reciprocation on the support for the hammer and positioned so as to engage the outer lap sections only of the side seam on the horn extension for bending inwardly the metal along the outwardly projecting portions of said bar to tension the metal supporting the outer lap section so as to hold the lap sections in intimate contact while solder bonding, and means for presenting said container bodies one after another to the bumping hammer and the bumping pins.

FOLKE W. ANDERSON.

REFERENCES CITED

The following references are of record in the file of this patent:

UNITED STATES PATENTS

| Number | Name | Date |
| --- | --- | --- |
| 206,031 | Mather | July 16, 1878 |
| 1,086,700 | Clark | Feb. 10, 1914 |
| 1,315,000 | Anderson | Sept. 2, 1919 |
| 1,475,399 | Kronquest | Nov. 27, 1933 |
| 1,543,460 | Troyer | June 23, 1925 |
| 1,625,091 | Peters | Apr. 19, 1927 |
| 1,663,970 | Brenzinger | Mar. 27, 1928 |
| 1,770,041 | Peters | July 8, 1930 |
| 1,867,857 | Meyers | July 19, 1932 |
| 2,070,906 | Kruse | Feb. 16, 1937 |
| 2,183,738 | Brenzinger | Dec. 19, 1939 |
| 2,335,916 | Coyle | Dec. 7, 1943 |

FOREIGN PATENTS

| Number | Country | Date |
| --- | --- | --- |
| 67,941 | Germany | Aug. 16, 1892 |